Feb. 28, 1967  A. L. NASVYTIS  3,306,686
MULTI-ROLLER HIGH SPEED BEARINGS
Filed May 19, 1964  4 Sheets-Sheet 1
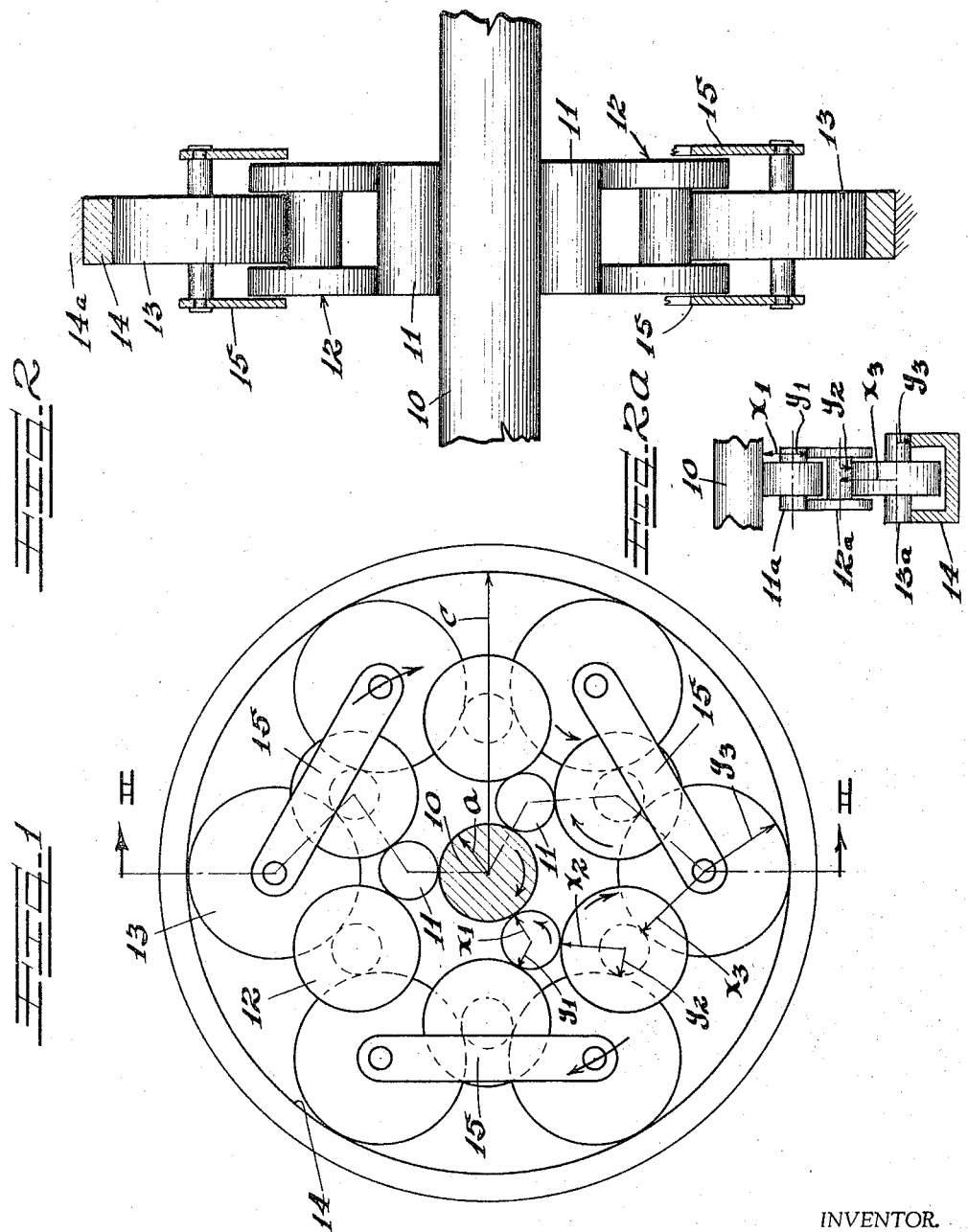
INVENTOR.
Algirdas L. Nasvytis
BY
ATTORNEYS Feb. 28, 1967 A. L. NASVYTIS 3,306,686
MULTI-ROLLER HIGH SPEED BEARINGS
Filed May 19, 1964 4 Sheets-Sheet 3
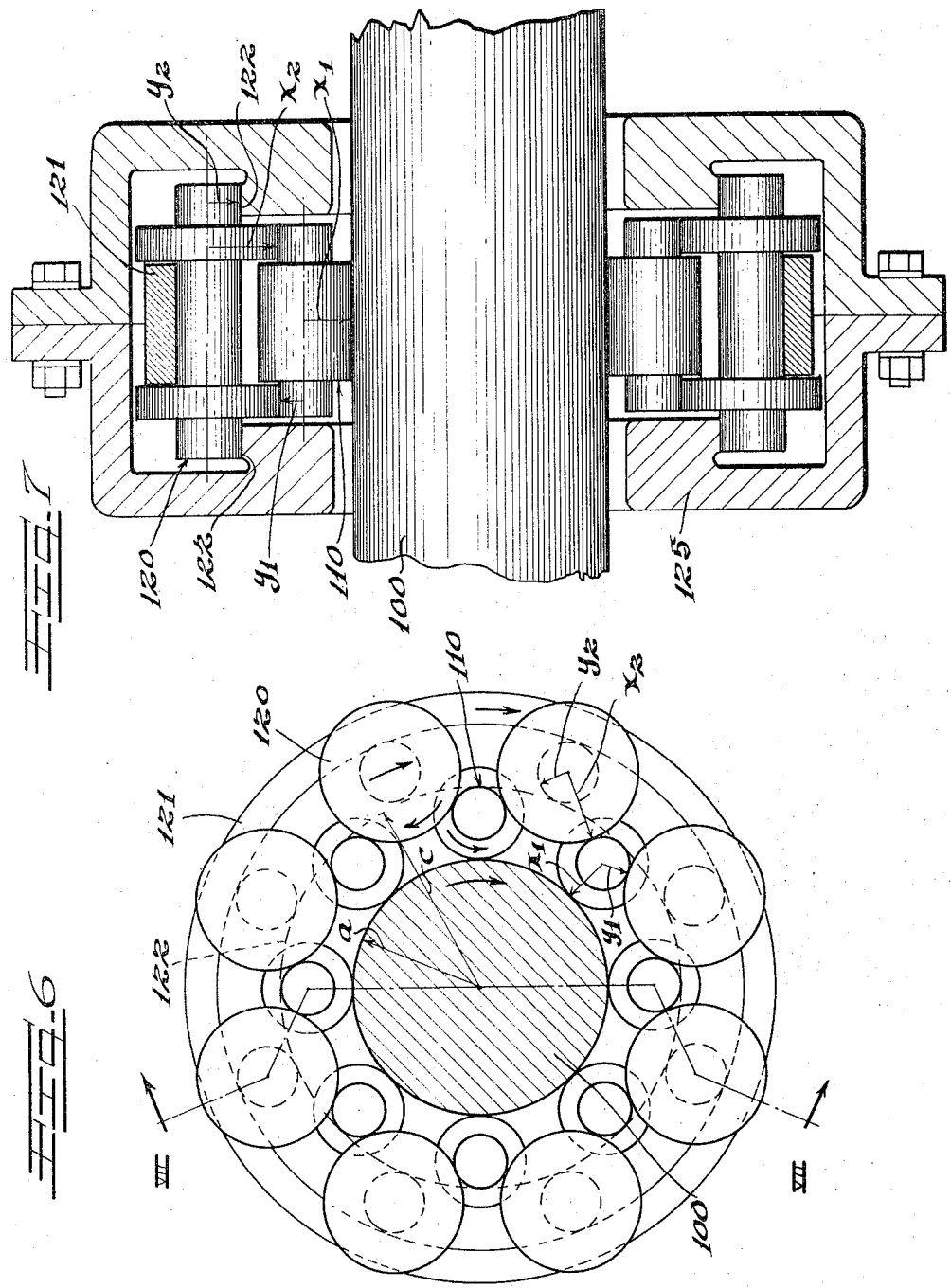
INVENTOR.
*Algirdas L. Nasvytis*
BY
*Hill, Sherman, Meroni, Gross & Simpson*
ATTORNEYS

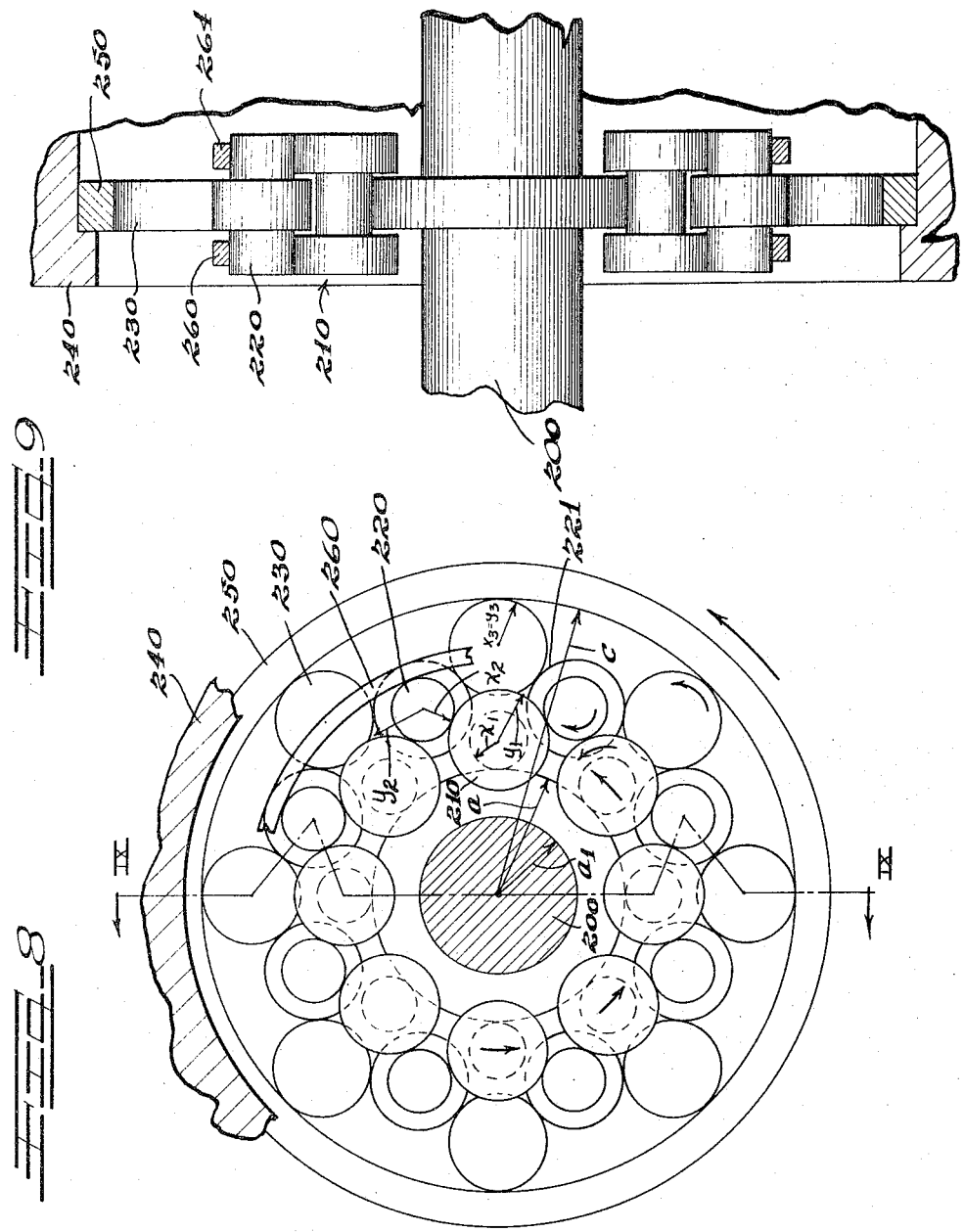

United States Patent Office 3,306,686
Patented Feb. 28, 1967

3,306,686
MULTI-ROLLER HIGH SPEED BEARINGS
Algirdas L. Nasvytis, Cleveland, Ohio, assignor to TRW Inc., a corporation of Ohio
Filed May 19, 1964, Ser. No. 368,595
7 Claims. (Cl. 308—202)

The present invention relates to roller bearings and is, more particularly, concerned with the provision of roller bearings capable of speeds much greater than the speeds heretofore known in roller bearing constructions. At the same time, the improved, extremely high speed, bearings of the present invention are constructed and arranged to carry unusually large loads, far beyond those previously considered possible at the rotational speeds involved.

As those skilled in the art of anti-friction bearing construction are aware, it has been considered impractical to construct high load apparatus to rotate at speeds in excess of approximately 40,000 r.p.m. At speeds this great and greater, roller or ball bearings sufficiently large to carry the load are, at the same time, sufficiently great in mass so that centrifugal forces are so great as to destroy the bearing rolling surfaces and rotating cage. Further, ball or roller bearings employ bearing cages which of necessity add friction, as well as undesirable vibrations, to the over-all system.

When it is recalled that the centrifugal force of a rotating body, or a body swinging about a radius, is computed, it varies on the formula $$F = \frac{mv^2}{r}$$

where $m$ is the mass of the body, $v$ is its lineal velocity, and $r$ is its radius of turn. Thus, in an installation having a shaft rotation on the order of 15,000 r.p.m., the ball or roller bearings employed to support the shaft would be rotating approximately two-fifths that speed, around the shaft axis. It will be seen that as their speed about that axis increases, the centrifugal force attendant with such speed increase very rapidly assumes extremely large proportions and becomes the limiting factor to the speed of the over-all system. While high speeds have been possible with extremely small bearings, a fraction of an inch in diameter, at which the linear velocity of the roller bearings is relatively small at high shaft speed the shaft size, and resultant bearing size and distance from the center of shaft rotation, increased to accommodate heavier loads, causes the velocity, in feet per second, of the rollers to increase in direct proportion to the increase in radius.

An analysis of the forces causing bearing destruction leads to the inescapable conclusion that the forces causing destruction of a bearing lie not within the rotation of the supported shaft itself or in the speed of rotation of the supporting roller bearings about their own axes. Instead, the destructive forces are those that result from movement of the supporting rollers about the axis of rotation of the supported shaft. Accordingly, the system of the present invention contemplates substantially reducing the velocity of movement of the supporting rollers about the axis of the supported shaft while providing a substantial increase in the angular rotation of the supported shaft itself. This result is accomplished, in accordance with the principles of the present invention, by supporting the shaft by means of a plurality of sets of planetary rollers arranged in a manner providing a velocity of the planetary rollers about the axis of the supported shaft which may very easily be one-tenth or less that of a simple roller bearing of the conventional type arranged to support an equivalent shaft. Additionally, in installations where it is desired, the bearing cage may be eliminated and the frictional forces ordinarily associated with such cage structures in conventional bearings may accordingly be eliminated.

In accordance with the present invention, a system of rolling contacts substantially identical to that employed in pure friction gearing type rolling contact planetary gearing may be employed. In such a system, the supported shaft may be considered the equivalent of a sun gear, and the outer supporting race or housing may be considered a fixed ring gear. The supporting rollers constitute, in such a system, planet members. By providing a multitude of sets of planet rollers, and by providing compound diameters for one or more sets, the rotational velocity of the planet sets about the axis of the supported shaft may be reduced to a very small fraction of the velocity of conventional roller bearings.

It is, accordingly, an object of the present invention to provide a new and improved high speed, heavy duty, bearing system.

Another object of the present invention is to provide a high speed bearing not requiring bearing cage elements.

Still a further object of the present invention is to provide a roller bearing system capable of providing heavy duty support for a shaft rotating at angular velocities in excess of 250,000 revolutions per minute.

Still a further object of the present invention is to provide extremely high speed, heavy load, bearings capable of manufacture at costs much below the cost of prior art high speed bearings capable of producing only a small fraction of the speeds provided by the present bearing system.

A feature of the invention resides in a provision of a bearing system for supporting a shaft, wherein the supporting bearings comprise a plurality of sets of planet rollers.

Yet another feature of the invention resides in providing a high speed bearing system comprising a plurality of sets of planetary support rollers, in which the shaft is preloaded in a precise, and relatively simple, manner.

Still other and further objects and features of the present invention will at once become apparent to those skilled in the art from a consideration of the attached drawings and specifications, wherein several embodiments of the invention are shown by way of illustration only, and wherein:

FIGURE 1 is an end-elevational view in partial cross-section of a support bearing constructed in accordance with the principles of the present invention;

FIGURE 2 is a cross-sectional view taken along the line II—II of FIGURE 1;

FIGURE 2a is a partial cross-sectional view illustrating a modified form of the structure shown in FIGURE 2;

FIGURE 6 is an end-elevational view in partial cross-section illustrating a further form of the invention employing two sets of planet support rollers;

FIGURE 7 is a cross-sectional view taken along the line VII—VII of FIGURE 6;

FIGURE 8 is an end-elevational view in partial cross-section of a still further modified form of the present invention; and FIGURE 9 is a cross-sectional view taken along the line IX—IX of FIGURE 8.

As shown on the drawings:

Figure 3:
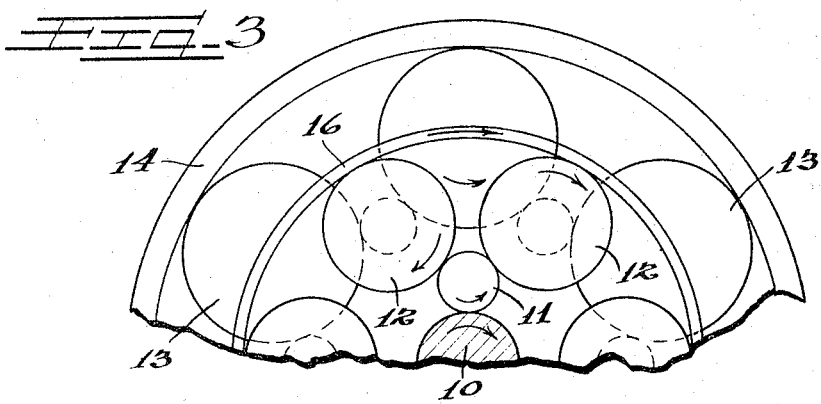
FIGURE 3 is a partial end-elevational view of a modified form of structure shown in FIGURE 1.

As may be seen from a consideration of FIGURE 1; a shaft 10 is supported by a plurality of rows of planet rollers, indicated at 11, 12, and 13, the roll 13 of which in turn rolls within inwardly facing race 14. Race 14 is fixedly secured in any conventional manner to a fixed housing, diagrammatically illustrated at 14a in FIGURE 2. As shown, the rollers 11, 12, and 13 are in interengagement with each other in pure rolling contact. Accordingly, the shaft 10 is supported in rolling contact relative to the race 14. The rollers are of such diameters relative to the shaft 10 and race 14 as to provide an initial preload, or interference fit relationship, which preferably is approximately one to two times the maximum load intended for action transversely of the axis of shaft 10.

When one considers that the support bearing illustrated in FIGURES 1 and 2 has a planetary system, in which the shaft has a radius $a$ and the internal radius of the ring 14 equals $c$, the speed of the shaft 10 relative to the planetating rollers 11, 12, and 13 corresponds to the speed ratio R. Where ring 14 is fixed, the ratio R equals $$\frac{c x \cdot x_2 \cdot x_3}{a y_1 y_2 y_3} + 1$$

In the embodiment illustrated, it will be seen that the radius $x_1$ equals the radius $y_1$ since rollers 11 are simple rollers. In the form illustrated this is also true of rollers 13 where $x_3$ equals $y_3$. However, in the intermediate rollers 12, $x_2$ is approximately 2.5 times as large as $y_2$. Employing the above formula for ratio in planetary gearing in which the outer race is fixed in a high speed bearing having the proportions illustrated in FIGURE 1, a set of values has been found satisfactory, as follows: $a=.225$ inch; $x_1=y_1=.135$ inch; $x_2=.3148$ inch; $y_2=.125$ inch; $x_3=.3862$ inch; $c=1.375$ inches; with a resulting ratio $R=16.4$. It will be observed that this ratio is approximately five times the ratio that would result if the rollers 11 comprised conventional roller bearings rolling in a race having a radius $c=a+x_1+y_1$ or .495 inch; in which latter case $R=3.2$. In other words, the rotation of the planet clusters, comprising the gears 11, 12, and 13, in the bearing illustrated, is 1/16 the rotational speed of the shaft 10 and is approximately 1/5 the speed of rollers such as 11 were they to run in a conventional bearing. Further, it will be apparent to those skilled in the art that the ratio of 16 may be multiplied substantially merely by providing compound rollers 11 and 13 having ratios $x_1/y_1$ and $x_3/y_3$ greater than 1 as in the manner shown for $x_2/y_2$. Such an arrangement of compound rollers may be visualized from a consideration of FIGURE 2a wherein roller 11a has radius $x_1$ greater than $y_1$, radius $x_2$ greater than $y_2$ and radius $x_3$ greater than $y_3$, thereby readily providing a ratio R on the order of 40 or greater. With a cluster speed, accordingly, of approximately 1/40 that of the shaft 10, it will be observed that bearing speeds for the shaft 10 may exceed 200,000 r.p.m. without exceeding a cluster rotation of 5,000 r.p.m. around the axis of the shaft 10. By reducing the shaft diameter further, the shaft speed may run far beyond the speed of 200,000 r.p.m.

Due to the fact that loads transmitted from the shaft 10 to the rollers 12 are transmitted via rollers 11, the vector force of such loads on the rollers 12 does not travel in a truly radial direction. Therefore, the loads applied against rollers 13 by the rollers 12 are not equally directed. Accordingly, the bearing is not completely stable without means for tying rollers 13 together or otherwise positively locating them relative to one another. In the embodiment illustrated in FIGURE 1, this is accomplished by means of rigid links 15 pivotally carrying adjacent pairs of rollers 13. This rigid chordal linking prevents adjacent rollers from moving peripherally relative to one another with resultant irregular radially outward or inward movement of rollers 12. Such stability may also be provided by employing a rigid plate having radial slots loosely accommodating the pivots of all rollers 13.

Figure 4:
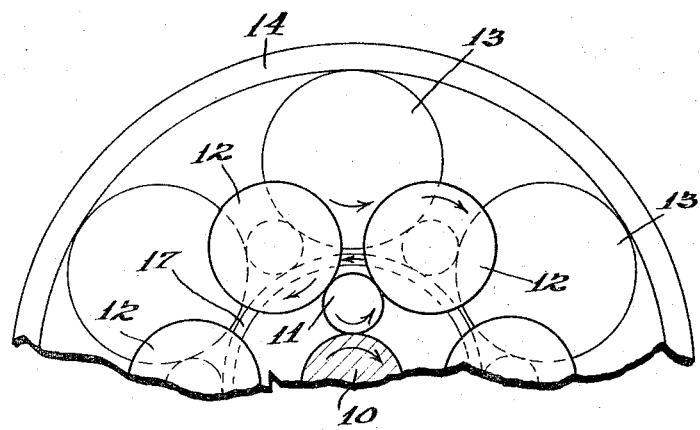
FIGURE 4 is a partial end-elevational view of a further modified form of the invention illustrated in FIGURES 1 and 3.
Figure 5:
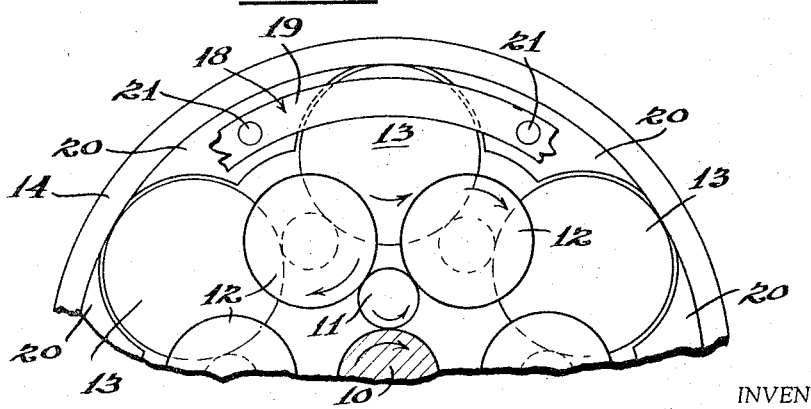
FIGURE 5 is still a further modified form of the structure illustrated in FIGURES 1 and 4, in partial end elevation.

Stability is also variously provided in FIGURES 3, 4, and 5. In FIGURE 3, a pair of annular free-wheeling solid rings 16 is provided in lightly preloaded contact with the larger diameter ($x_2$) surfaces of the roller 12. The provision of the annular rings 16 prevents rollers 12 from moving radially outwardly at any point. This, of course, precludes any radial varying movement of any of the rollers 12 and without such radial movement, it will be apparent that the positions of rollers 13 relative to the rollers 12 will remain fixed, and the system stable. Similarly, an annular ring 17 may be employed in the manner illustrated in the embodiment of FIGURE 4. There, the annular ring 17 co-operates with the small diameter ($y_2$) of rollers 12 on the radially inwardly facing edge thereof. The ring 17 free-wheels in the direction opposite to the direction of rotation of the planet clusters and is lightly preloaded sufficiently to prevent movement of any of the individual rollers 12 radially inwardly. When such radial inward movement of any roller 12 is prevented, it will be apparent that no radial outward movement of any other roller may be accomplished and, at the same time, the rolls 13 are fixed in space relative to rollers 12.

In the embodiment illustrated in FIGURE 5, a different arrangement is provided for maintaining the rollers 13 in their fixed relationship relative to rollers 12. As there shown, a cage 18 is provided having a support ring 19 and intermediate separators 20 secured thereto by pins 21 or similar means. With this arrangement, the separators 20 act in the manner of a conventional roller bearing cage to prevent the rollers 13 from moving peripherally toward or away from each other, thereby stabilizing the system.

In FIGURES 6 and 7, an inherently stable two row bearing system is illustrated. As there shown, the rotating shaft 100 rotates a first row of compound rollers 110 which co-operates with a second row of compound rollers 120. A free-wheeling ring 121 co-operates with the rollers to maintain them in the preloaded, bearing, relationship. However, the fixed support member comprises a radially outwardly facing annular surface 122 carried by fixed housing 125. The need for the use of a radially outwardly facing fixed support surface is evident when it is recalled that utilization of a radially inwardly facing fixed ring would, when coupled with only two rows of rollers, provide a reversing system. As in the case of the systems illustrated in FIGURES 1 through 5, the ratio of shaft rotation to cluster rotation equals $$R = \frac{cx \cdot x_2}{a y_1 y_2} + 1$$

Similarly, it will be apparent that compound rollers may be utilized for both rows of rollers, as illustrated, or alternatively, only one or the other of the rows of rollers 110, 120 may be provided with compound radii, depending upon whether a maximum ratio (minimum velocity of the clusters) is desired.

As noted above, the system of FIGURES 6 and 7 is inherently stable since the second row rollers are restricted for radial movement. Accordingly, no special cages or other means are required to maintain the parts in a constant, relative, position with respect to each other. Such a bearing construction, employing two rows of compound rollers in the proportions generally illustrated, will quite satisfactorily handle shaft speeds on the order 50 to 100,000 r.p.m., the relationship between the diameters as illustrated providing a ratio $R=$ approximately 8.

In some uses, it will be impossible to employ bearings in which the shaft rotates while the housing remains fixed. Instead, it will be desired that the shaft remain a fixed stub shaft, or the like, with a rotating housing mounted thereon. For example, such a mount would be equivalent to that of the front wheel of an automobile which is mounted upon a fixed supporting spindle. In such an installation, the present invention operates quite suitably to provide an extremely high speed heavy load carrying bearing. Such an arrangement may be seen from a consideration of FIGURES 8 and 9 wherein supporting stub shaft 200 is provided supporting a rotating outer housing, wheel, or the like, 240. As shown, two rows of compound rollers and a single row of simple rollers are provided in the form, respectively, of rollers 210, 220, and 230. As in the case of the embodiments illustrated in FIGURES 1 through 5, in which three rows of rollers are employed, the system of FIGURES 8 and 9 is unstable unless the second row of rollers is stabilized. This may be accomplished as in the embodiments illustrated in FIGURES 1 through 5 and such stabilization is illustrated in FIGURES 8 and 9 by way of a pair of annular rings 260 which are preloaded to maintain rollers 220 in their precise radial position and which operate, accordingly, to stabilize the entire system against relative displacement of any of the rollers with respect to ring 250 or shaft 200.

It will be observed that in the form illustrated in FIGURES 8 and 9, the radii $x_1$ and $x_2$ are in each case smaller than the respective radii $y_1$ and $y_2$, and a greater ratio is provided by utilizing enlarged radius $a$ greater than $a_1$. In the formula set out above, i.e., $$R = \frac{cx_1x_2x_3}{ay_1y_2y_3} + 1$$

it will be observed that if $x$ is consistently less than $y$ then it is possible that $c/a$ is smaller than $$\frac{y_1y_2y_3}{x_1x_2x_3}$$

and R be less than 1. Calling $$\frac{1}{R} = S$$

the reduction of cluster speed relative to speed of ring 250 equals $S+1$. Accordingly, a reduction in cluster speed relative to the speed of ring 250 is provided.

From the above, it will be seen that I have provided bearings capable of supporting extremely high and heretofore unheard of shaft speeds, even with relatively large components and, hence, relatively large loads. With the roller systems employed, the rollers act in a planetary manner but free-wheel rather than transmit any drive torques. Accordingly, the preload of the bearing system may be one-tenth or one-twentieth of that required were the system being employed as a torque transferring planetary transmission. As a result of such light preloads, the rolling losses will be extremely small. As above noted, the roller clusters will rotate much slower than the rollers in standard roller bearings, in fact up to 100 times slower. Since centrifugal force of the moving parts varies directly with the square of the velocity of such parts, this tremendous reduction in speed reduces centrifugal forces to a very low level permitting fantastic shaft speeds without setting up impractical loads on the shaft supports. In most of the embodiments illustrated, all rubbing surfaces have been eliminated and only pure rolling contact remains. In view of this rolling contact, and the parallel rolling surfaces, the bearing friction losses with the present systems are preferable to those of a standard bearing employing a friction positioning cage. Further, it has been found that the thermal differential growth of the bearing will affect the bearing in the range of 10 to 20% of the carrying load rather than several hundred percent of the load fluctuation often found in simple bearings. In the circumstances, it will be obvious to those skilled in the art that the bearings of the present invention comprise an important improvement in the field of shaft support.

It will also be apparent to those skilled in the art that variations and modifications may be made in accordance with the teachings hereinabove set forth, without departing from the scope of the novel concepts of this invention. It is, accordingly, my intention that the scope of the invention be limited solely by that of the hereinafter appended claims.

I claim as my invention:

1. A high-speed roller bearing providing high speed rotational support between shaft and housing members rotatable relative to each other, means providing a radially outwardly facing bearing race surface on the shaft member, means providing a radially inwardly facing bearing race surface in said housing member, three sets of planet rollers in free-wheeling support engagement between said race surfaces, means maintaining the rollers of the intermediate set of said three sets in fixed relative peripheral and radial position and said intermediate set being in direct rolling engagement between the inner and outer sets of said three sets.

2. A high-speed roller bearing providing high speed rotational support between shaft and housing members rotatable relative to each other, means providing a radially outwardly facing bearing race surface on the shaft member, means providing a radially inwardly facing bearing race surface in said housing member, three sets of planet rollers in free-wheeling support engagement between said race surfaces, and means rotatable about said shaft member in the direction of rotation thereof maintaining the rollers of the intermediate set of said three sets in fixed relative peripheral and radial position, said last named means comprising separating members fixedly peripherally positioning the outermost set of planet rollers relative to each other and said intermediate set being in direct rolling engagement between the inner and outer sets of said three sets.

3. A high-speed roller bearing providing high speed rotational support between shaft and housing members rotatable relative to each other, means providing a radially outwardly facing bearing race surface on the shaft member, means providing a radially inwardly facing bearing race surface in said housing member, three sets of planet rollers in free-wheeling support engagement between said race surfaces, and means maintaining the rollers of the intermediate set of said three sets in fixed relative peripheral and radial position, said last named means comprising annular free-wheeling ring means in supporting engagement with said intermediate set of planet rollers and said intermediate set being in direct rolling engagement between the inner and outer sets of said three sets.

4. A high-speed roller bearing providing high speed rotational support between shaft and housing members rotatable relative to each other, means providing a radially outwardly facing bearing race surface on the shaft member, means providing a radially inwardly facing bearing race surface in said housing member, three sets of planet rollers in free-wheeling support engagement between said race surfaces, and means maintaining the rollers of the intermediate set of said three sets in fixed relative peripheral and radial position, said last named means comprising an annular free-wheeling ring in supporting engagement with the radially outwardly facing surface of said intermediate set of planet rollers and said intermediate set being in direct rolling engagement between the inner and outer sets of said three sets.

5. A high-speed roller bearing providing high speed rotational support between shaft and housing members rotatable relative to each other, means providing a radially outwardly facing bearing race surface on the shaft member, means providing a radially inwardly facing bearing race surface in said housing member, three sets of planet rollers in free-wheeling support engagement between said race surfaces, and means maintaining the rollers of the intermediate set of said three sets in fixed relative peripheral and radial position, said last named means comprising an annular free-wheeling ring in supporting engagement with the radially inwardly facing surface of said intermediate set of planet rollers and said intermediate set being in direct rolling engagement between the inner and outer sets of said three sets.

6. A high-speed roller bearing providing high speed rotational support between shaft and housing members rotatable relative to each other, means providing a radially outwardly facing bearing race surface on the shaft member, means providing a radially inwardly facing bearing race surface in said housing member, three sets of planet rollers in free-wheeling support engagement between said race surfaces, and means rotating in the same direction as said planets about said shaft maintaining said sets of planets in fixed peripheral spaced condition relative to each other providing stable support interengagement and the intermediate set of said three sets being in direct rolling engagement between the inner and outer sets of said three sets.

7. A high-speed roller bearing providing high speed rotational support between shaft and housing members rotatable relative to each other, means providing a radially outwardly facing bearing race surface on said shaft, means providing a bearing race surface in said housing member, and three radially spaced sets of planet rollers in torque-free support engagement between said race surfaces, said planets and race surfaces being positioned in interference-preloaded-fit relation equivalent to less than two times the design load of said shaft and the intermediate set of said three sets being in direct rolling engagement between the inner and outer sets of said three sets.

References Cited by the Examiner
UNITED STATES PATENTS

| 943,570 | 12/1909 | Schluss | 308—206 |
|---|---|---|---|
| 1,505,311 | 8/1924 | Collaghan | 308—206 |
| 1,699,233 | 1/1929 | Foley | 308—206 |

FOREIGN PATENTS 90,484  2/1897  Germany.

MARTIN P. SCHWADRON, *Primary Examiner.*

FRANK SUSKO, *Examiner.*